Oct. 24, 1939.  J. EGGERT ET AL  2,177,417
PHOTOGRAPHIC PRINTING ON LENTICULAR FILMS
Filed Nov. 26, 1935
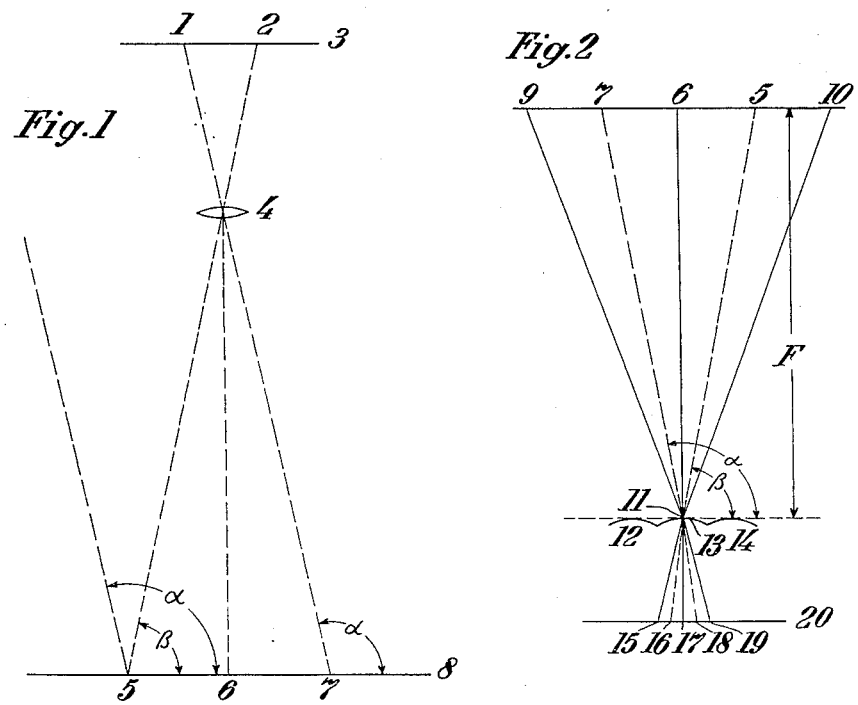
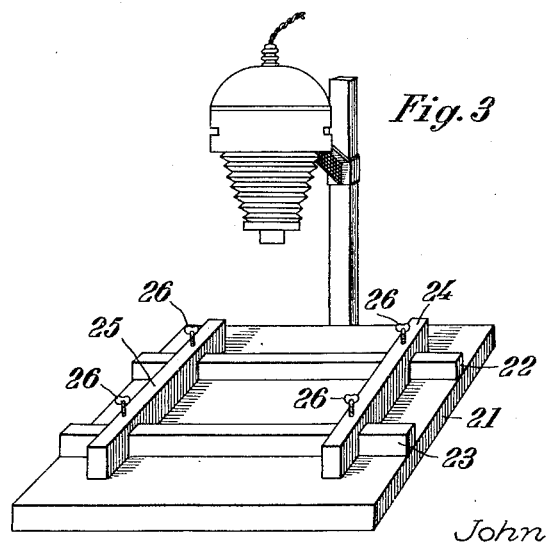
John Eggert
Gerd Heymer
Inventors
By their Attorneys Patented Oct. 24, 1939

2,177,417

UNITED STATES PATENT OFFICE

2,177,417

PHOTOGRAPHIC PRINTING ON LENTICULAR FILMS

John Eggert, Leipzig-Gohlis, and Gerd Heymer, Wolfen, Kreis Bitterfeld, Germany, assignors to I. G. Farbenindustrie Aktiengesellschaft, Frankfort-on-the-Main, Germany Application November 26, 1935, Serial No. 51,560 In Germany November 27, 1934

5 Claims. (Cl. 95—5)

Our present invention relates to photographic printing on lenticular films and more particularly to printing stereoscopic component pictures on lenticular film.

One of its objects is an improved process of printing stereoscopic component pictures on lenticular film. Further objects will be seen from the detailed specification following hereafter. Reference is made to the accompanying drawing in which:

Fig. 1 shows an arrangement for printing in accordance with the invention,

Fig. 2 shows the relationship between the characteristics of the film and the distance from which it is to be viewed, and Fig. 3 shows a device for printing in accordance with the invention.

It has been proposed to print stereoscopic component pictures on lenticular films so that by viewing a picture through the lenticular surface there is seen a stereoscopic picture of the original object. The stereoscopic component pictures may be copied either by the contact method or optically. In the first case the component negatives of a stereoscopic pair are laid successively on the lenticular face of the film, while the film is exposed to light incident from different directions. In the optical printing an objective of large aperture is used, one half being covered on each exposure so that the two component pictures are thrown upon the film successively as real images. The use of objectives of large aperture, however, has the disadvantage that the prints are proportionally lacking in sharpness. It is the object of the present invention to minimise this disadvantage.

According to the invention an objective of any desired small aperture is used for the optical printing. The position of the film in relation to the printing objective is so selected that the middle of the lenticular film falls successively on each side of the optical axis at half the distance between the eyes from this axis, and the middles of the component pictures to be printed fall in the point of intersection of the straight lines through the middle of the image of the lenticular film and the middle of the objective with the plane of the negative picture. In practising the process it is possible to use any desired enlarging apparatus with an objective of any desired aperture. As compared with the known processes the present one has the advantage that the prints obtained are of enhanced sharpness. The process is, moreover, of particular advantage when enlarged stereoscopic pictures are being produced, since most enlarging objectives are of small aperture. Existing apparatus, therefore, is available for the process.

The aforesaid conditions, namely that the middles of the two component pictures must be brought into alignment with the middle of the lenticular film, are only approximately essential. It is of advantage to deviate from the conditions to the extent that certain lines of the picture are in alignment with the print. These lines must, in general, be outstanding lines; for example, light lines on a dark ground or dark lines on a light ground, particularly in the middle foreground. Should the foreground, however, contain no such lines, corresponding lines in the background may be used. If the lines in the foreground are not very marked but, on the other hand, outstanding lines exist in the background, the latter lines are brought into alignment on the print. The lines on the pictures may be brought into the required position by means of a device hereinafter described for fixing the positions of the printing frame.

The optical relationships will be more clearly understood by reference to the accompanying diagrams, Figs. 1 and 2.

In Fig. 1, the necessary arrangement of the stereoscopic component pictures and the lenticular film in relation to the copying objective is shown diagrammatically. At 8 is arranged the screen of a lenticular film which is arranged at the distance 4—6 from the objective 4 of an enlarging apparatus. 3 is the plane in which the stereoscopic component pictures that are to be printed are successively mounted. In order to ascertain the correct position of the lenticular film and of the stereoscopic component picture there is first marked on the screen 8 the point 6, at which the axis of the objective 4 intersects the screen surface. The points 7 and 5 are marked 65 mm. apart, this being the distance between the eyes, and at equal distances from 6.

In printing the first component picture is so arranged that the middle of the picture coincides with the point 1 in the extension of the line 7—4, so that the middle of the enlarged picture is projected to 7. The lenticular film, on which the print is to be made, is at the same time with its lenticular side 8 so that its middle lies at 7 and its cylindrical lenses extend perpendicularly to the plane of the drawing. When the stereoscopic component picture to be printed is illuminated from above, the rays passing through 1 in the plane at right angles to the longitudinal direction of the lenticular film make, with the film, an angle α. For printing the second component picture the lenticular film is shifted, so that while the direction of the lenticular embossing is the same, the middle of the picture field is placed at 5. The second component picture of the stereoscopic pair is so arranged that the middle of the picture is at about point 2. The angle of incidence of the copying rays in this case is β.

In order to bring the outstanding lines in the foreground or background into alignment a screen, for instance, a sheet of paper is arranged at 8 so that when inserting the first component picture at 1 the enlarged picture is projected on the screen at 7. Then a mark is applied to the screen at the place where the outstanding line appears. The screen is then arranged at 5 and the second component picture is moved around 2 until the outstanding line is in alignment with the mark. Thus the place for the second component picture in printing is determined.

After suitable development the picture is ready for exhibition. The distance from which the picture should be viewed is correct if it be equal to the distance 4—6 when the lenticular film is illuminated. This distance must, therefore, be preliminarily selected so that it is an average distance for viewing the picture. However, in making this selection the properties of the lenticular film material must be taken into account, inasmuch as it is not possible to combine every lenticular film with every distance of view. The relationship in question is now to be explained with reference to Fig. 2.

In this figure 12, 13 and 14 represent three adjacent lenticular elements in the middle of the lenticular film, the scale being much exaggerated. The angles α and β between the rays passing through the middle 11 of the cylindrical lens 13 to the points 7 and 5 have the same significance as in Fig. 1. The distance 7—5 in Fig. 2 is the same as in Fig. 1, namely equal to the distance between the eyes, which is generally taken as 65 mm. If the rays 5—11 and 7—11 are continued through 11 they will intersect the emulsion layer 20 of the lenticular film at 16 and 18 respectively. If $7-5=a$, $6-11=F$, $11-17=f$ and $16-18=b$, the following formula expresses the relationship when $n$ is the refractive index of the film material—

$$\frac{f}{b} = \frac{n.F}{a}$$

The breadth of the lenticular elements, the focal length and the distance between the eyes must be so selected that $b \leq d$, $d$ being the width of the lenticular element. As, in general, the constants of the film material, namely $d$ and $f$, also depend on $n$, it will be seen that the formula $$F \geq \frac{f.a}{n.d}$$

must always be true. In this case stereoscopic reproduction is still possible. The best reproduction is obtained, however, for a certain distance from F at which all points 16 and 18 under all the lenticular elements have the same distance from each other and from the corresponding points 16 and 18 under the adjacent lenticular elements, because in this case the impoverishment due to the scattering of light from one component picture on to the other amounts to a minimum. The value of this overlapping is calculated from F as follows: In Fig. 2, 15 and 19 are those points in the surface 20 whose distance from one another is exactly equal to the width $d$ of a lenticular element. They are the real images of the points 10 and 9 in the plane at the distance F. If all points 16 and 18 are to have the same distance from each other and from the corresponding points beneath the adjacent lenticular elements, the relationship $16-18=b=\frac{1}{2}d$ must obtain. Correspondingly, $7-5=(\frac{1}{2})9-10$. From the first expression there follow the relationships $$\frac{f}{b} = \frac{n.F}{a}$$

and $$\frac{2f}{d} = \frac{n.F}{a}$$

from which follows for F the expression $$F = \frac{2a.f}{n.d}$$

From this it may be deduced that if, for example $$a=65 \text{ mm.}, f=0.14 \text{ mm.}$$
$$d=0.028 \text{ mm.}, n=1.5 \text{ mm.}$$

the distance of the enlarging objective from the lenticular film should be 43 cms. Since this distance is suitable for viewing the picture the particular lenticular film having the values given is useful for the process. In order to simplify mechanical handling in the operations necessary for the process, auxiliary devices may be used. These may include, in particular, devices for the correct arrangement of the component pictures to each other. In general it has been found useful in stereoscopic exposure to bring into alignment not the diagrammatic middles of the pictures but those points which particularly attract the eye, especially the points in the foreground.

An apparatus for exposing the lenticular film is shown in perspective view in Fig. 3 by way of example. On the baseboard 21 are fixed two bars 22 and 23 which serve as guiding rails for the movable laths 24 and 25 which can be clamped in place by the screws 26. Between 22 and 23 well fitting normal copying frames can be introduced. 24 and 25 are now clamped in such positions that the copying frames can be shifted to and fro through a distance of 65 mm.

Quite similar devices are provided on the surface on which the stereoscopic pictures are mounted and these hold the component pictures in the correct positions. In this case the laths 24 and 25 must be so adjusted that those lines which it is desired to bring into alignment are brought into the corresponding positions of the copying frame on the baseboard. With the aid of a scale different points in the stereoscopic pictures can be determined, which must be taken into consideration in relationship to the distance at which the picture is to be viewed and the properties of the lenticular film.

What we claim is:

1. A process of printing stereoscopic component pictures on a light-sensitive lenticular film having lenticulations with an index of refraction $n$, a focal distance $f$ and a breadth $d$ which comprises arranging said lenticular film at a distance F from the printing objective, $$F \geq \frac{f.a}{n.d}$$

F being the distance from which the film is to be viewed, $a$ being the distance between the eyes so that the middle of the lenticular film is positioned at a point spaced from the optical axis of the objective a distance equal to half the normal interpupillary distance of an observer, arranging the first component picture with its center on the line drawn from the middle of the lenticular film through the center of the printing objective in the plane conjugate to the plane of the lenticular film, exposing said lenticular film through said component picture, shifting the lenticular film to a position in which its middle is at a point spaced on the opposite side of the optical axis of said objective a distance equal to half the normal interpupillary distance of an observer, arranging the second component picture so that its center lies on the line through the center of the lenticular film and the center of said printing objective in the plane conjugate to the lenticular film, exposing the lenticular film through said second component picture, and developing said exposed lenticular film.

2. A process of printing stereoscopic component pictures on a light-sensitive lenticular film having lenticulations with an index of refraction $n$, a focal distance $f$ and a breadth $d$ which comprises arranging said lenticular film at a distance F from the printing objective, $$F = \frac{2a.f}{n.d}$$

F being the distance from which the film is to be viewed, $a$ being the distance between the eyes, so that the middle of the lenticular film is positioned at a point spaced from the optical axis of the objective a distance equal to half the normal interpupillary distance of an observer, arranging the first component picture with its center on the line drawn from the middle of the lenticular film through the center of the printing objective in the plane conjugate to the plane of the lenticular film, exposing said lenticular film through said component picture, shifting the lenticular film to a position in which its middle is at a point spaced on the opposite side of the optical axis of said objective a distance equal to half the normal interpupillary distance of an observer, arranging the second component picture so that its center lies on the line through the center of the lenticular film and the center of the said printing objective in the plane conjugate to the lenticular film, exposing the lenticular film through said second component picture, and developing said exposed lenticular film.

3. A process of printing stereoscopic component pictures on a light-sensitive lenticular film, which comprises arranging a light-sensitive lenticular film and a printing objective in such a manner that said objective has the same distance to said film from which said film is to be viewed and the middle of said lenticular film is positioned at a point spaced from the optical axis of said objective a distance equal to half the normal interpupillary distance of an observer, arranging the first component picture with its center on the line drawn from the middle of said lenticular film through the center of said printing objective in the plane conjugate to the plane of said lenticular film, exposing said lenticular film through said component picture, shifting said lenticular film to a position in which its middle is at a point spaced on the opposite side of the optical axis of said objective a distance equal to half the normal interpupillary distance of an observer, arranging the second component picture so that its center lies on the line through the center of said lenticular film and the center of said objective in the plane conjugate to the plane of said lenticular film, exposing said lenticular film through said second component picture, and developing said exposed lenticular film.

4. A process of printing stereoscopic component pictures on a light-sensitive lenticular film, which comprises arranging a light-sensitive lenticular film and a printing objective in such a manner that said objective has the same distance to said film from which said film is to be viewed and the middle of said lenticular film is positioned at a point spaced from the optical axis of said objective a distance equal to half the normal interpupillary distance of an observer, arranging the first component picture with its center on the line drawn from the middle of said lenticular film through the center of said printing objective in the plane conjugate to the plane of said lenticular film, exposing said lenticular film through said component picture, shifting said lenticular film to a position in which its middle is at a point spaced on the opposite side of the optical axis of said objective a distance equal to half the normal interpupillary distance of an observer, arranging the second component picture in the plane conjugate to the plane of said lenticular film so that outstanding lines are in alignment in the plane of the lenticulations of the film with the outstanding lines in exposing through said first component picture, exposing said lenticular film through said second component picture, and developing said exposed lenticular film.

5. A process of printing stereoscopic component pictures on a light-sensitive lenticular film, which comprises arranging a light-sensitive lenticular film and a printing objective in such a manner that said objective has the same distance to said film from which said film is to be viewed and the middle of said lenticular film is positioned at a point spaced from the optical axis of said objective a distance equal to half the normal interpupillary distance of an observer, arranging the first component picture with its center on the line drawn from the middle of said lenticular film through the center of said printing objective in the plane conjugate to the plane of said lenticular film, exposing said lenticular film through said component picture, shifting said lenticular film to a position in which its middle is at a point spaced on the opposite side of the optical axis of said objective a distance equal to half the normal interpupillary distance of an observer, arranging the second component picture in the plane conjugate to the plane of said lenticular film so that outstanding lines in the foreground are in alignment in the plane of the lenticulations of the film with the same outstanding lines in exposing through said first component picture, exposing said lenticular film through said second component picture, and developing said exposed lenticular film.

JOHN EGGERT.
GERD HEYMER.